United States Patent [19]

Miller, II

[11] Patent Number: 5,600,707
[45] Date of Patent: Feb. 4, 1997

[54] WIRELESS CHANNEL SETUP USING LOW BANDWIDTH NETWORK FOR SELECTING HIGH BANDWIDTH DATA BEARER CHANNEL OF ANOTHER NETWORK SYSTEM FOR DATA TRANSMISSION

[75] Inventor: Robert R. Miller, II, Morris Township, Morris County, N.J.

[73] Assignee: Lucent Technologies Inc., Murray Hill, N.J.

[21] Appl. No.: 299,673

[22] Filed: Aug. 31, 1994

[51] Int. Cl.$^6$ .................................................. H04Q 7/22
[52] U.S. Cl. ........................................ 379/59; 455/33.1
[58] Field of Search ............................ 379/58, 59, 93, 379/98, 63, 105; 375/222, 219; 348/16; 455/33.1; 370/95.1

[56] References Cited

U.S. PATENT DOCUMENTS

| | | | |
|---|---|---|---|
| 4,654,866 | 3/1987 | Böttle et al. | 348/16 X |
| 5,134,611 | 7/1992 | Steinka et al. | 379/93 X |
| 5,396,539 | 3/1995 | Slekys et al. | 379/59 |
| 5,406,615 | 4/1995 | Miller, II et al. | 379/59 |
| 5,432,838 | 7/1995 | Purchase et al. | 379/58 X |

*Primary Examiner*—Curtis Kuntz
*Assistant Examiner*—William G. Trost
*Attorney, Agent, or Firm*—Alfred G. Steinmetz

[57] ABSTRACT

A data transmission system includes a low bandwidth two way transmission network which is employed to arrange access to and use of a wide bandwidth bearer channel to facilitate the transmission of data at a wide bandwidth enhancing the efficiency of data transmission. In one embodiment, a low bandwidth telecommunication service is used to set up a wide band channel connection on a wide band telecommunication service to allow the user to communicate high speed data without the necessity of overhead addressing and accessing communications on that channel.

7 Claims, 5 Drawing Sheets

WIRELESS CHANNEL SETUP USING LOW BANDWIDTH NETWORK FOR SELECTING HIGH BANDWIDTH DATA BEARER CHANNEL OF ANOTHER NETWORK SYSTEM FOR DATA TRANSMISSION

FIELD OF THE INVENTION

This invention relates to data transmission networks and in particular to a wireless dam transmission system in which access and mediation are performed at low information rates over a narrow bandwidth channel and in which data transmission is over a wide bandwidth channel selected, set up and supervised and maintained by the narrow bandwidth channel.

BACKGROUND OF THE INVENTION

Use of narrow bandwidth communication channels for the transmission of data is both highly inefficient and time consuming in the use of the communication channel. Narrow bandwidth channels are normally selected for data transmission because that is the channel initially used to access and mediate the data transmission and since most wireless systems use a common system for a plurality of functions. A data channel may be set up on a wide band channel and then used for data transmission; but such use of a wide band channel for access and mediation is inefficient because the traditional set up techniques are designed to use narrow bandwidth transmission channels.

SUMMARY OF THE INVENTION

A data transmission system, embodying the principles of the invention, includes a narrow bandwidth two way transmission network which is employed to arrange access to and control use of a wide bandwidth bearer channel to facilitate the transmission of data at a wide bandwidth, enhancing the efficiency of data transmission. In one embodiment a narrow bandwidth telecommunication service is used to set up a wide band channel connection on a wide band telecommunication service to allow the user to communicate high speed data without the necessity of overhead addressing and accessing communications on that wide band channel. The narrow bandwidth channel and wide bandwidth channel may be in entirely different bands/ranges of the radio spectrum.

In a particular embodiment, a terminal including a cellular radio modem and a wireless ISDN (W-ISDN) modem are included as co-resident in a mobile radiotelephone terminal. Upon power-on of a cellular terminal, the terminal acquires an overhead channel permitting the set up of a conventional cellular channel for narrow band width voice communication. The call initiator may then request a high data rate channel (i.e. super channel) in which the set up and selection of the data transmission rates are the choice of the initiator.

In the process of super channel set up, the origination of the call is arranged on a low rate narrow bandwidth communication system and a data transmission connection is determined between the origination and termination. The caller requests assignment of a wide band data channel and a wide band modem of the terminals is enabled. The caller is assigned a wide band channel which is dedicated to transmission of his data and is identified by a specific code. Upon acknowledgment of this connection, the wide band channel is assigned and data transmission is carried over this channel. During the data transmission the narrow bandwidth cellular channel remains available to the caller for further control signaling. The wide band channel may be two way although for typical data transmission the narrow is in one direction.

In another embodiment the cellular handset and the wide bandwidth modem are preprogrammed to connect to a preselected wide bandwidth data transmission system.

The modems may be programmed to use cellular TDMA and W_ISDN simultaneously for voice and data.

DETAILED DESCRIPTION

Figure 1:
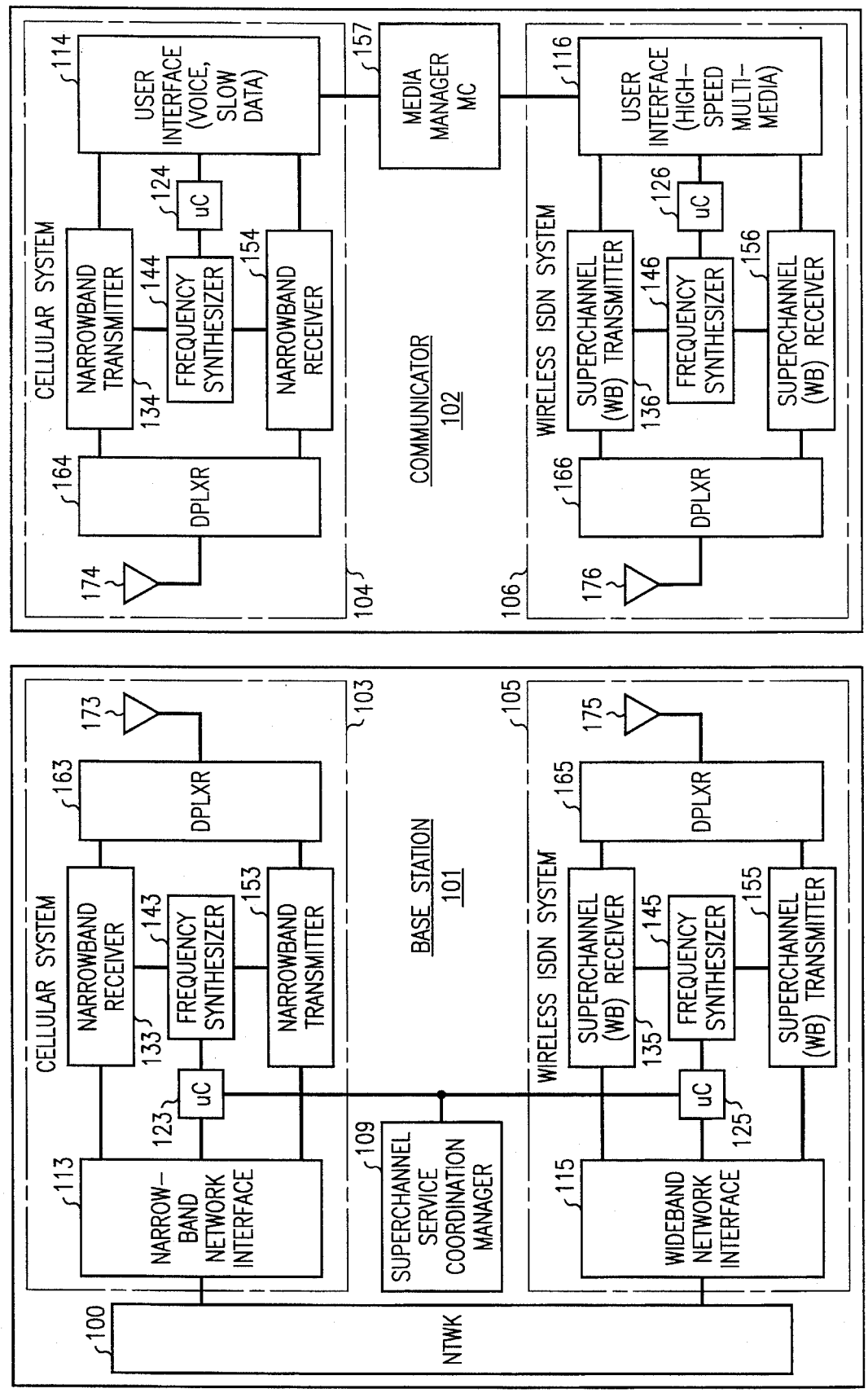
FIG. 1 is a block schematic of the components of a data transmission system to implement access to wide band transmission channels through narrow band width overhead channels.

A combination of wireless communication components for enabling set up of a high data rate channel for data transmission through a low rate transmission channel is shown in the FIG. 1. The components shown, which may be those of a TDMA (i.e. time division multiple access) communication system, include a base station 101 and a wireless communicator 102. The base station connects to a landline public telephone network 100. Included at the base station are a narrow band network interface 113 operative at cellular system frequencies connected to the landline network 100 and a wide band network interface 115 operative at the data rate frequency and also connected to the landline network 100. A super channel service coordinator manager 109 is included to co-ordinate activities of a cellular transceiver 103 and a wireless ISDN transceiver 105, located at the base station 101.

The cellular transceiver 103 portion of the base station 101 includes a controlling micro computer 123 which is connected to control the narrow band network interface and the frequency synthesizer 143 of the transceiver. The frequency synthesizer 143 is connected to supply frequency to both the narrow band receiver 133 and the narrow band transmitter 153. Both receiver 133 and transmitter 135 are connected through a duplexer 163 including filters to an antenna 173.

The wireless ISDN 105 portion includes a micro controller 125 connected to control a frequency synthesizer 145 which in turn supplies frequency signals to a wide band (super channel) receiver 135 and a wide band (super channel) 155. Both receiver 135 and transmitter 155 are connected to the duplexer filter 165 which in turn is connected to the antenna 175. The controlling micro computers 123 and 125 are connected to each other and to the super channel service coordinator manager 101.

The personal communicator 102 includes a narrow band cellular system transceiver 104 and a wireless ISDN wide band transceiver 106. A micro controller 157 operates as a media manager to coordinate the activities of the transceivers 104 and 106. Its function is analogous to the function of the super channel service coordinator manager 109 of the base station. The micro controllers 101 and 157 may determine what type of media is being sent to allow use of a wide band channel; a normal cellular channel or a combination of the two. They may additionally change the media form one form to another such as text to speech; video to still image; etc. for transmission over alternative channel bandwidths.

The cellular system transceiver 104 includes a user interface 114 for control and voice input and voice output. Control is provided by a micro controller 124 connected to the interface 114 and connected to control the frequency synthesizer 144. The frequency synthesizer 144 supplies frequency signals to a narrow band transmitter 134 and to a narrow band receiver 154. Both are connected to antenna 174, via a duplex filter 164.

The wide band communicator 106 has a user interface 116 which is designed to handle high speed data and multi-media signals. A micro controller 126 is connected to interface 116 and to a frequency synthesizer 146, which is in turn connected to supply frequency signals to a wide band (super channel) transmitter 136 and a wide band (super channel) receiver 156. These are both connected to antenna 176, via the duplex filter 166.

Figure 2:
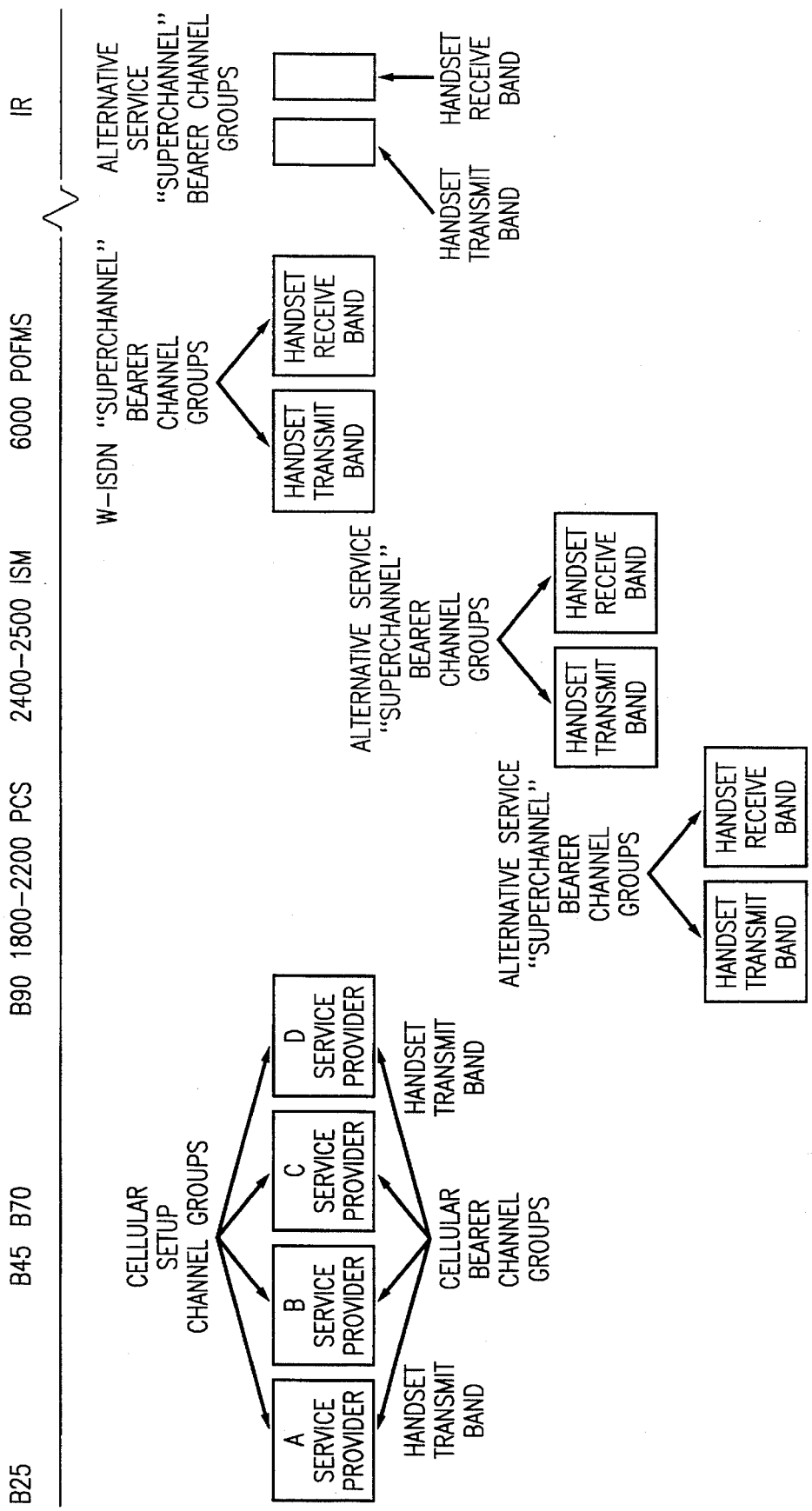
FIG. 2 is a diagram illustrating an illustrative assignment of channel frequencies to implement the data transmission system of FIG. 1.

An illustrative frequency band structure for operation of a data transmission system embodying the principles of the invention is diagramatically illustrated in FIG. 2. Frequency ranges are shown in the band of frequencies listed across the top of the figure. The frequencies range from the cellular band between 825 to 890 MHz to the PCS frequencies from 1800 to 2200 MHz, the ISM frequencies 2400 to 2500 MHz (.e.g. an Industrial Scientific and Medical band specified by the FCC), the POFMS frequency band at 6000 MHz (Private Operational Fixed Microwave Service band specified by the FCC) and higher frequency light IR bands. The set up channel group or frequencies are shown for both A and B service providers and are the frequencies used for cellular communications to set up the data bearer channels.

The various bearer channels for data transmission may be for any transmit or receive frequency illustrated or may comprise any other available high frequency channel, since frequencies according to the invention are not limited to the frequencies enumerated herein. The frequencies utilized presently for the W-ISDN system in the PCS, 15M and POFMS bands are however the preferred embodiment. Each band of frequencies provides two way communication and includes duplex transmit and receive channels. One way channels may be utilized when suitable.

Figure 3:
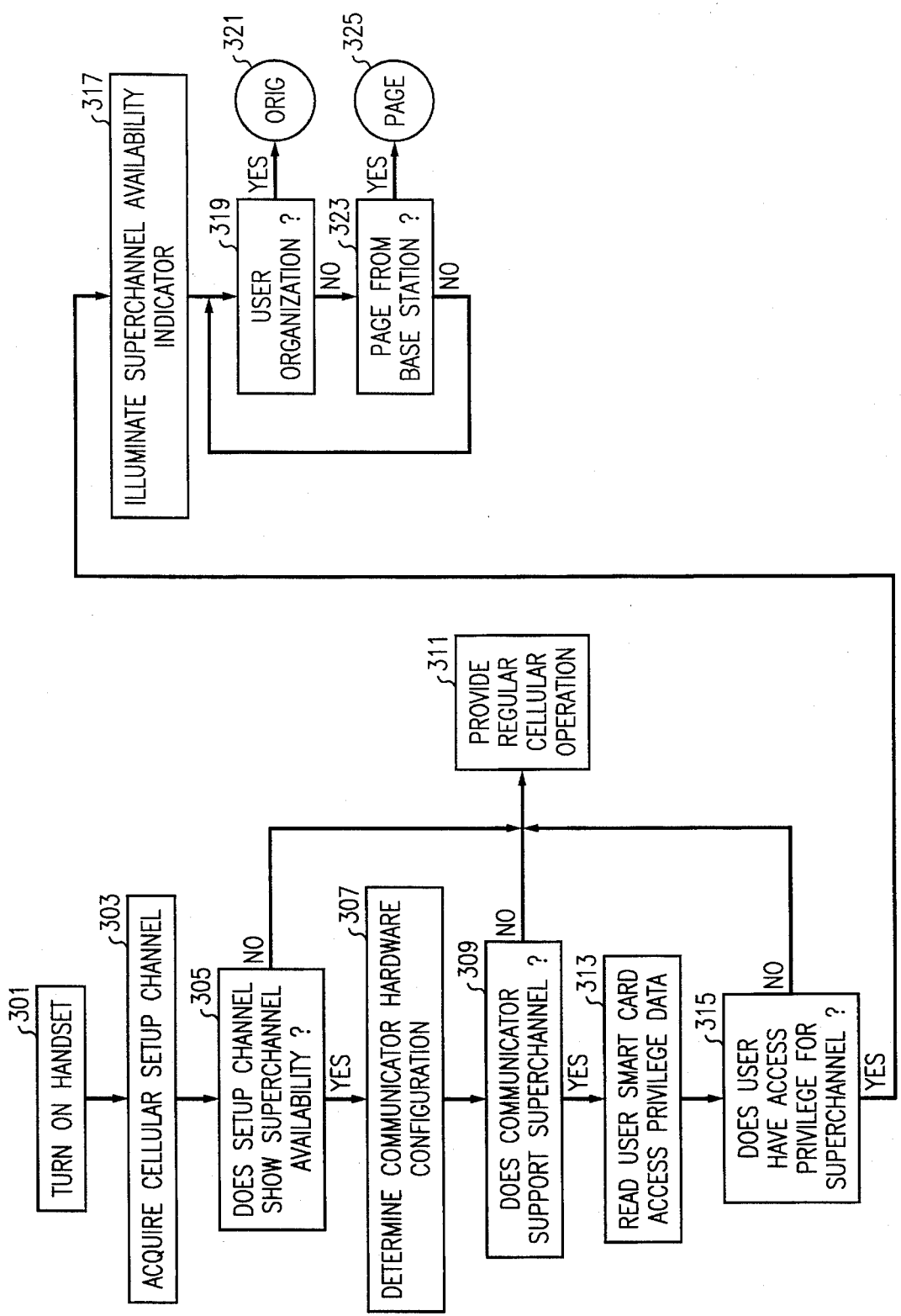
FIG. 3 is a flow chart illustrating the method of implementing initialization of the data transmission system.

The process of initially opening a wide band data bearer channel (super channel) is shown in the flow chart of FIG. 3. The process begins as shown in the block 301 with the turning on of a handset. The handset operates to acquire a cellular set up channel, as indicated in the block 303. The system inquires, upon user request, to determine if the communication system has an available super channel for data transmission as indicated in the decision block 305. If no super channel is available the process narrow proceeds to the input of decision block 311 for normal cellular operation. If a super channel bearer channel is available, the flow proceeds to block 307 in which system or user instructions determine the hardware configuration to access and accommodate the requirements for data transmission.

An inquiry is made to determine if the communicator has the equipment to support a super channel data bearer as indicated in the decision block 309. If it does not, regular cellular operation at cellular frequencies is provided for the data transmission as indicated in the block 311. If support is found for a super channel bearer channel the access privilege data is retrieved, as per block 313, from a memory which may be a user smart card to determine the level of service subscribed to and access to a super channel as per the decision block 315. If no super channel privilege exists the flow returns to block 311 and cellular channels are used for the data transmission.

If a super channel privilege is in effect the user is notified by an indicator indicating super channel availability indicated in block 317. A subsequent system inquiry determines if the request for a super channel is by user origination, as per decision block 319, or by a page request from a base station, as per block 323. The decision results appear in the originating or paging terminating units 321 or 325 to determine further processing.

Figure 4:
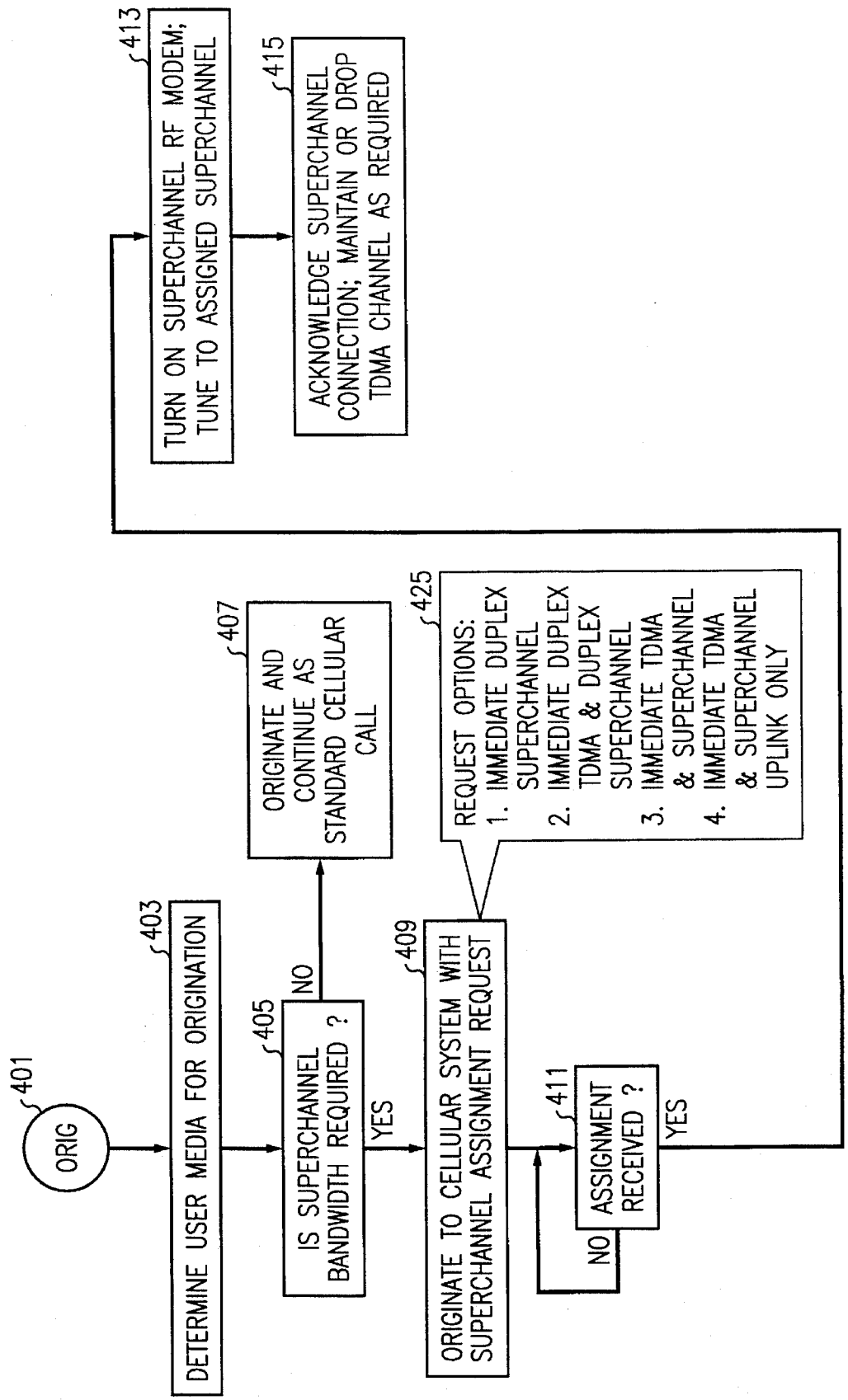
FIG. 4 is a flow chart illustrating the method of implementing origination of the data transmission system.
Figure 5:
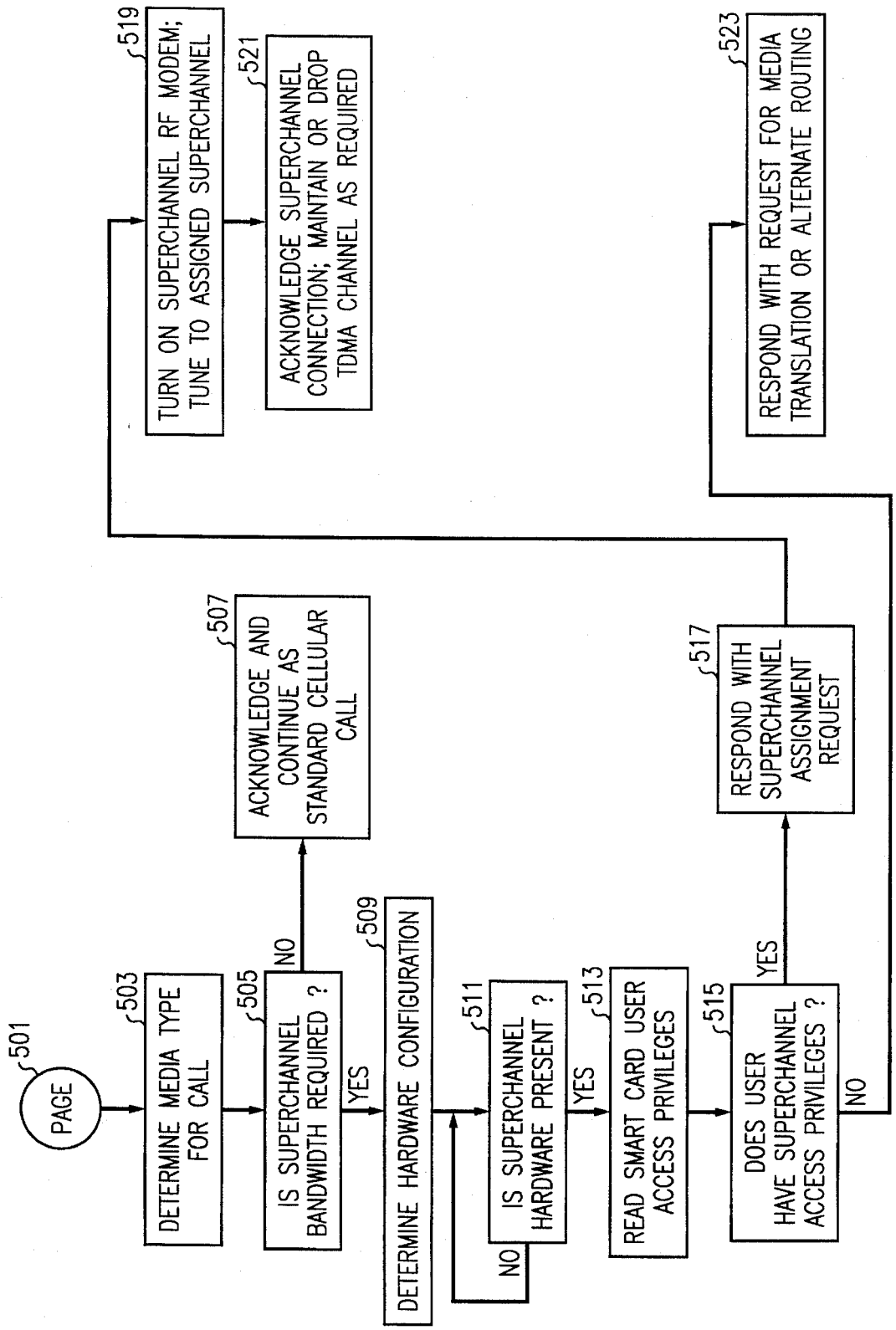
FIG. 5 a flow chart illustrating the method of implementing acknowledgment of the data transmission system set up.

The origination response is followed by the super channel operation process of FIG. 4. The origination terminal 401 is followed by a determination of the user media equipment and of the data transmitter as indicated in the instructions of block 403. A decision inquiry, as per block 405, inquires if a super channel bandwidth is required for the intended data transmission. If this bandwidth is not required the call is continued as a standard cellular call. If the wide bandwidth is required the request for a super channel is made through the cellular system as is indicated in the block 409. An illustrative list of some channel options is listed in he block 425 and includes a duplex super channel to combinations of cellular and super channel transmission channels. The options may include simultaneous use of cellular TDMA and W-ISDN for voice and data transmission.

A subsequent inquiry, as per decision block 411, determines if the desired channel assignment has been made. The process flow continues only after the assignment has been received and the super channel RF modem is activated and tuned to a super channel as per block 413. In tuning to a super channel the user may select a channel or the mobile modem may be preset to tune to a predetermined super channel. The super channel connection is acknowledged in block 415 and the cellular TDMA channel is maintained or dropped as required by the nature of the data transmission.

In the case of a request for a super channel that originates with a base station as in the case of a landline originated call begins with the page signal as per block 501. The media type to handle the call is determined in the block 503 and a subsequent decision block 505 involves determining if a super channel is required for the data transmission. If not the cellular call is continued to handle the data transmission as per block 507. The process of block 509 determines the hardware configuration if the super channel is deemed to be desirable. A subsequent inquiry indicated in decision block 511 inquires if super channel hardware is available for this purpose. The flow continues when hardware is available and an inquiry is made to a memory source such as a smart card to determine user access privileges as per block 513. If the user has super channel privileges as per decision block 515, the flow process continues to the block 519 which turns on a super channel RF modem and tunes to an assigned super channel. In block 517 the system responds with a super channel request and in block 521 the super channel connections is acknowledged and the TDMA cellular channel is acknowledged or dropped as needed in block 521. If the user does not have access to a super channel the flow proceeds from block 515 to block 523 which requests alternative channel routing.

What is claimed is:

1. A mobile telecommunication device for transmitting voice and data signals, comprising:

a cellular radiotelephone modem including cellular circuitry for responding to an initial power turn on to determine access to an overhead set up channel and connecting to the overhead set up channel when available;

a wireless wide band data transmission modem for connecting to an assigned wide bandwidth data transmission channel in response to the overhead set up channel indicating that a wide bandwidth channel is available if a wide bandwidth channel is required for data transmission.

2. A method of transmitting data over a wide bandwidth data channel with a mobile terminal having co-resident cellular radiotelephone and wireless data transmission modems, comprising the steps of:

setting up a cellular radiotelephone call between an origination and destination terminal over a narrow band overhead set up channel;

communicating with the cellular radiotelephone over the narrow bandwidth channel for arranging access and setup of the wide bandwidth data channel between the origination and destination terminal;

transmitting data over the wide bandwidth data channel.

3. A method of transmitting data over a wide bandwidth channel with a mobile terminal as claimed in claim 2, further utilizing cellular TDMA and wireless-ISDN simultaneously for TDMA voice transmission and wide band for data transmission, respectively.

4. A mobile telecommunication device for transmitting voice and data signals, as claimed in claim 1; wherein the assigned wide bandwidth data transmission channel is a two way data channel.

5. A method of transmitting data over a wide bandwidth channel as claimed in claim 2:

including the step of:

tuning to a wide bandwidth channel by tuning to a channel preselected and connected to through a wide band modem.

6. A wireless communication system for enabling the transmission of data; comprising:

a base station connected to a landline public telephone network and including:

a service coordination manager;

a fixed cellular system narrow band transceiver; having a first controller coupled to the service coordination manager and connected to control a frequency synthesizer connected in turn to supply frequency to a narrow band receiver and a narrow band transmitter; the narrow band transmitter and the narrow band receiver connected to an antenna through a common narrow band duplexer;

a fixed wireless ISDN wide band transceiver; having a second controller coupled to the service coordination manager and connected to control a second frequency synthesizer connected in turn to supply frequency to a wide band receiver and a wide band transmitter;the narrow band transmitter and the narrow band receiver connected to an antenna through a common wide band duplexer;

a mobile radiotelephone device, including:

a mobile cellular system narrow band transceiver; having a first mobile controller coupled to a user voice/command interface and further connected to control a mobile frequency synthesizer connected to supply frequency to a narrow band mobile transmitter and a narrow band mobile receiver and the narrow band mobile transmitter and the narrow band mobile receiver connected to an antenna through a mobile narrow band duplexer;

a mobile cellular system wide band ISDN transceiver; having a second mobile controller coupled to a user high speed data interface and further connected to control a mobile frequency synthesizer connected to supply frequency to a wide band mobile transmitter and a wide band mobile receiver and the wide band mobile transmitter and the wide band mobile receiver connected to an antenna through a mobile wide band duplexer.

7. A wireless communication system for enabling the transmission of data as claimed in claim 6; comprising:

the first and second controller operating to select transmission media to include cellular and wide band transmission together.

* * * * *